US010145706B2

(12) United States Patent
Knobel et al.

(10) Patent No.: US 10,145,706 B2
(45) Date of Patent: Dec. 4, 2018

(54) NAVIGATION SYSTEM AND NAVIGATION METHOD

(71) Applicant: Bayerische Motoren Werke Aktiengesellschaft, Munich (DE)

(72) Inventors: Martin Knobel, Munich (DE); Josef Schumann, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/086,209

(22) Filed: Nov. 21, 2013

(65) Prior Publication Data
US 2014/0142842 A1 May 22, 2014

(30) Foreign Application Priority Data
Nov. 22, 2012 (DE) .................... 10 2012 221 305

(51) Int. Cl.
*G01C 21/36* (2006.01)
*G01C 21/34* (2006.01)

(52) U.S. Cl.
CPC ..... *G01C 21/3682* (2013.01); *G01C 21/3476* (2013.01); *G01C 21/3614* (2013.01); *G01C 21/3617* (2013.01); *G01C 21/3679* (2013.01)

(58) Field of Classification Search
None
See application file for complete search history.

(56) References Cited

U.S. PATENT DOCUMENTS

| 6,542,814 | B2 * | 4/2003 | Polidi ............... G01C 21/3682 340/990 |
| 7,133,775 | B2 * | 11/2006 | Adamski et al. ............ 701/438 |
| 7,630,828 | B2 * | 12/2009 | Tajima ............... G01C 21/3617 340/995.1 |
| 8,054,196 | B2 * | 11/2011 | Hilliar Isaacson ........ 340/686.6 |
| 8,731,821 | B2 * | 5/2014 | Sheynblat ..................... 701/426 |

(Continued)

FOREIGN PATENT DOCUMENTS

| DE | 101 00 956 A1 | 7/2002 |
| DE | 10 2008 037 262 A1 | 5/2009 |

(Continued)

OTHER PUBLICATIONS

German-language Search Report with English translation dated Jun. 26, 2013 (10 pages).

*Primary Examiner* — Redhwan K Mawari
*Assistant Examiner* — Edward Torchinsky
(74) *Attorney, Agent, or Firm* — Crowell & Moring LLP

(57) ABSTRACT

In a navigation method, coordinates and additional information concerning several places, so-called places of interest, are stored as data in a memory. Surrounding-area parameters are predefined by which, with respect to arbitrary places, one surrounding area respectively is defined which surrounds the place. During a traveling movement with a navigation device, one pertaining surrounding area respectively is acquired by use of the surrounding-area parameters and the respective current location of the navigation device. By way of the stored coordinates, at least one of the stored places of interest is determined which is situated in the acquired surrounding area. The additional information stored with respect to the determined place of interest is outputted by way of a user interface.

27 Claims, 6 Drawing Sheets

(56) References Cited

U.S. PATENT DOCUMENTS

| | | |
|---|---|---|
| 2003/0158658 A1 | 8/2003 | Hoever et al. |
| 2003/0191578 A1* | 10/2003 | Paulauskas et al. .......... 701/200 |
| 2010/0088018 A1 | 4/2010 | Tsurutome et al. |
| 2010/0094550 A1 | 4/2010 | Tsurutome et al. |
| 2010/0138151 A1 | 6/2010 | Jang et al. |
| 2011/0112710 A1 | 5/2011 | Meyer-Ebeling et al. |
| 2013/0211719 A1* | 8/2013 | Boschker ............ G01C 21/3484 701/533 |
| 2014/0274107 A1* | 9/2014 | Rados ........................ 455/456.1 |
| 2015/0219468 A1* | 8/2015 | Ziezold .............. G01C 21/3453 701/410 |

FOREIGN PATENT DOCUMENTS

| | | |
|---|---|---|
| DE | 10 2009 052 853 A1 | 5/2011 |
| WO | WO 2008/083735 A1 | 7/2008 |

\* cited by examiner

NAVIGATION SYSTEM AND NAVIGATION METHOD

CROSS REFERENCE TO RELATED APPLICATIONS

This application claims priority under 35 U.S.C. § 119 from German Patent Application No. 10 2012 221 305.8, filed Nov. 22, 2012, the entire disclosure of which is herein expressly incorporated by reference.

BACKGROUND OF THE INVENTION

The invention relates to a navigation system and a method for navigating, particularly to so-called places of interest, by means of a vehicle. Such places of interest may be places of a predefined category, for example, of a "tourist destination" category.

In known navigation systems, for example, BMW's "Professional" navigation system, it is possible to query, by means of the current location, which special destinations are situated in the area, for example, railroad stations, government agencies, airports, hospitals, restaurants or places of importance to tourists or sightseeing locations. Those and other places, which are of interest to the user, can be indicated by the navigation systems, for example, by means of distance information with respect to the current location of the navigation system.

In US 2010/0138151 A1, a corresponding route guidance system is described in which so-called points of interest (POI) are indicated, in which case additional information relating to the POIs, such as openings hours, is outputted. The additional information is updated by a databank linkup and can be retrieved by the route guidance system in real time.

From WO 2008/083735 A1, a navigation device is known by which points of interest can also be indicated, a plurality of additional information concerning the respective POI being outputted. The additional information can be made available, for example, by way of a hyperlink on an internet page as a video film, as a detailed document with a text and picture, for example, with typical guidebook information.

In DE 101 00 956 A1, a navigation method is described in which a destination is selected according to a destination category, and a route is computed to this destination. When the current location changes, it is checked whether a different destination of the same category is closer to the changed current location and, if applicable, a new route is computed to this other destination.

The contents of the above-mentioned publications are hereby expressly incorporated into the present specification by reference.

SUMMARY OF THE INVENTION

It is an object of the invention to make the navigating more flexible during a trip by use of a navigation device to places of interest, so that it will not be necessary to input a destination into the navigation device ahead of time.

This and other objects are achieved by means of the claimed method and system.

According to a first aspect of the invention, a navigation method is provided by which coordinates and additional information concerning several places, so-called places of interest, are stored as data in a memory. It comprises the following steps:

(a) surrounding-area parameters are predefined by which, with respect to arbitrary places, one surrounding area respectively is defined which surrounds the place;

(b) during a traveling movement with a navigation device, one pertaining surrounding area respectively is acquired by way of the surrounding-area parameters and the respective current location of the navigation device;

(c) by use of the stored coordinates, at least one of the stored places of interest is determined which is situated in the acquired surrounding area; and (d) the additional information stored with respect to the determined place of interest is outputted by way of a user interface.

According to the invention, it was recognized that by automatically acquiring the surrounding area during the travel movement, an output of the additional information can be dynamically implemented and can thereby be flexibly adapted to the respective position. In particular, it becomes possible by way of the invention that neither a travel destination nor a place of interest have to be predefined at the start of the trip and especially no concrete destinations have to be input in the navigation system by way of the operator interface. The selection and display of the information concerning the places of interest takes place in an automated manner but flexibly during the traveling movement. Also, no decision has to be made already at the beginning of the trip as to whether a or, if applicable, which place of interest is selected but this decision can advantageously be made during the trip.

According to a further aspect of the invention, it is provided for navigating by way of a vehicle that coordinates and additional information concerning several places of interests are stored as data in a navigation system. Furthermore, destination area parameters are predefined by which, with respect to arbitrary places, one destination area respectively is defined that surrounds the place. At the beginning of the trip using the vehicle, no trip destination is input, and during a drive of the vehicle, a respectively pertaining destination area is acquired by way of the destination area parameters and the respectively current location of the vehicle. By use of the stored coordinates, particularly automatically, at least one of the stored places of interest is determined which is situated in the acquired destination area. The additional information stored concerning the determined place of interest will then be outputted by way of a user interface of the navigation system. The destination area parameters correspond particularly to the surrounding area parameters.

Additional information may, for example, comprise texts, numbers, graphics, pictures, sounds, including voice and/or films.

As a result of the fact that no drive destination or trip destination is input at the beginning of a drive or trip, a so-called open-destination navigating can take place by way of a vehicle, where, at the beginning of the drive, a driver does not yet determine or know which places of interest will be indicated in the course of the drive/trip, which places of interest are to be the destination and/or where the drive will finally lead. The stored coordinate data and additional data of the predefined places of interest can be used in multiple regards. By means of the coordinate data, a destination area can be acquired during the drive and/or a place of interest can be determined. By means of the coordinate data, it can be determined in this case whether the respective place of interest, with respect to the current location of the vehicle meets previously defined display criteria, such as route spacing, in order to output data of the place of interest by way of the user interface, for example, by way of a graphical user interface, GUI, to the vehicle driver. The coordinate data and/or the additional data, for example, can be output as data. These data can be automatically and dynamically indicated during the drive by use of destination area parameters. For example, they can dynamically light up on the user interface as soon as a place of interest arrives inside this radius of the current location of the vehicle, and can just as dynamically disappear again from the user interface when the place of interest is outside of this radius of the current location of the vehicle again. By means of the invention, a dynamic travel route guide can therefore also be created.

The additional data stored concerning the places of interest can also be used for determining whether the respective place of interest meets previously defined display criteria, for example, with respect to a thematic criterion, such as "Sports", "Culture", "Food", in order to output data of the place of interest by way of the user interface.

After the output of the additional information, a person operating the system, can select or decide, particularly by way of the operating interface, whether the respective place of interest is to be approached and, if applicable, whether the navigation system should automatically compute the route to this place of interest and display it. In this case, additional route information, such as the route length and a probable arrival point in time, can be output by way of the user interface.

A place of interest may be a place of a certain interest category, particularly a tourist site, a place for special events or activities, such as swimming or hiking, an adventure site, such as a leisure park, a nature park or a site with a special natural spectacle, for example, a waterfall, or another site. A drive according to the invention may naturally also comprise intermediate stops, particularly at different places of interest. A special user experience can, for example, be achieved, where different places of interest are offered to the user without a destination determined beforehand. The user can in each case arbitrarily approach these places depending on his interest, or he can directly, i.e. without approaching the offered place of interest, set out to a next place of interest not previously known to him. He can make the corresponding decision on an individual basis in a free and spontaneous fashion during the drive. By means of the invention, it is also possible to achieve the goal of increasingly stimulating respective users to investigate, for example, to explore areas.

The destination area acquisition can take place during the drive at predefined or randomly selected points in time. It can, for example, take place at time intervals, for example, regularly at 30-second intervals or minute intervals. The points in time may also be defined according to other criteria, for example, indirectly by route kilometers of the vehicle. For this purpose, the control for acquiring the destination area is connected with corresponding clocks, trip counters, etc. of the navigation system and/or of the vehicle. The vehicle preferably is an individual transport vehicle, such as passenger car, a motorcycle or a bicycle.

In a preferred embodiment of the invention, the destination area parameters or a destination area, within which a search takes place for stored places of interest, are input before the beginning of the drive or at the beginning of the drive. A radius value, for example, 1 km, 5 km 20 km or 50 km, can be used as a destination area parameter, or a value for the maximal driving route or drive duration from the current location of the vehicle to the offered place of interest. However, limiting a certain destination area by means of coordinates may also be provided as a destination area parameter. This can, for example, take place in a graphical user interface on a map of the navigation system illustrated there, by means of a graphical tool, such as a frame whose size can be changed, or a freely shapeable so-called "lasso". The destination area parameters may also have respective minimum and maximum values, for example, a minimal or maximal distance from the current vehicle position.

In a further preferred embodiment of the invention, the output of additional information concerning the place of interest takes place as a function of at least one of the following adjustable route criteria:
  distance by air of the place of interest from the current vehicle location,
  route distance of the place of interest from the current vehicle location,
  predefined destination surroundings,
  road category of the route to the place of interest,
  current driving direction,
  current driving speed,
  current driving route.

When the trip takes place by way of a vehicle, the decision whether any information concerning a point of interest is output by way of the operating interface can be made as a function of what energy reserves are still available to the vehicle. This is particularly advantageous in the case of electric vehicles, in order to avoid that places of interest that are too far away from the current location are indicated or offered which can no longer be reached by means of the current battery charge status.

The output of the additional information concerning the place of interest can, for example, take place by use of the following adjustable and stored place-of-interest criteria:
  category of the place of interest,
  average duration of stay at the place of interest,
  weather data concerning the place of interest, in which case, data concerning the current weather can be acquired separately and, corresponding to the suitability of the weather for visiting the place of interest, a selective output of data concerning the place of interest can take place automatically,
  opening time of the place of interest, in which case the current time can be acquired separately and correspondingly the output of data concerning the place of interest can be selected automatically, and/or
  evaluation of the place of interest.

The scope of the data for the additional information to be stored and to be processed can be kept at a minimum. On the one hand, the corresponding technical expenditures can thereby be minimized; on the other hand, a certain sense of adventure can be experienced by the driver and possibly her companion when exploring the places of interest, because they experience much for the first time only when they arrive. The additional information can be limited, for example, to additional data, such as the name of the place of interest, the category of the place of interest, a short description of, for example, maximally 5, 10, 20, 50 or 100 words, a graphic and/or a single representative picture This information can also contain data for evaluating the place of interest, evaluating texts, star evaluations, etc. inputted by way of a social network. In such networks or device-covering navigation systems, places of interests with their coordinates and corresponding additional information can also be newly defined, and these data can be made available to the general public, for example, for downloading.

On the other hand, further additional information concerning the place of interest can be made accessible, particularly in steps, by way of data sources or can be loaded as a file, for example, by way of the navigation system, by way of telecommunication networks, by way of mobile radio equipment, by way of the internet and/or by way of a mobile data carrier, such as a CD/DVD or a memory card.

In particular, for an electric vehicle, such as an electric passenger car or an electric bike with a relatively narrowly limited range, it may be advantageous to also determine the following additional information by means of vehicle sensors and/or the navigation system and indicate this information by way of the operating interface:

- probable energy consumption, for example, in kWh, % of the energy storage device or liters of fuel, until the place of interest has been reached;
- probable energy storage device content, for example, battery charging status in % when reaching the place of interest;
- possibly available energy charging station or battery charging station at the place of interest;
- total energy consumption for the trip to the place of interest and subsequent direct return trip to the starting point of the trip; and or
- route distance for the drive to the place of interest and subsequent direct return trip to the starting point of the trip.

By use of displays of this type, it can, for example, be achieved that the amount of energy stored in the vehicle will be sufficient for reaching a next energy-relevant point, such as a public charging station, the starting point of the trip or the home location of the vehicle. In addition, it is achieved that the driver of the vehicle is always informed concerning respective energy-relevant circumstances, data and conditions of the vehicle and/or of the currently provided route in order to be able to correctly make corresponding driving decisions. He/she can be assisted in this case by further indications, such as range warning indications, which are automatically generated by way of machine analysis or processing of the mentioned circumstances, data and conditions.

Other objects, advantages and novel features of the present invention will become apparent from the following detailed description of one or more preferred embodiments when considered in conjunction with the accompanying drawings.

DETAILED DESCRIPTION OF THE EXEMPLARY EMBODIMENTS

Figure 1:
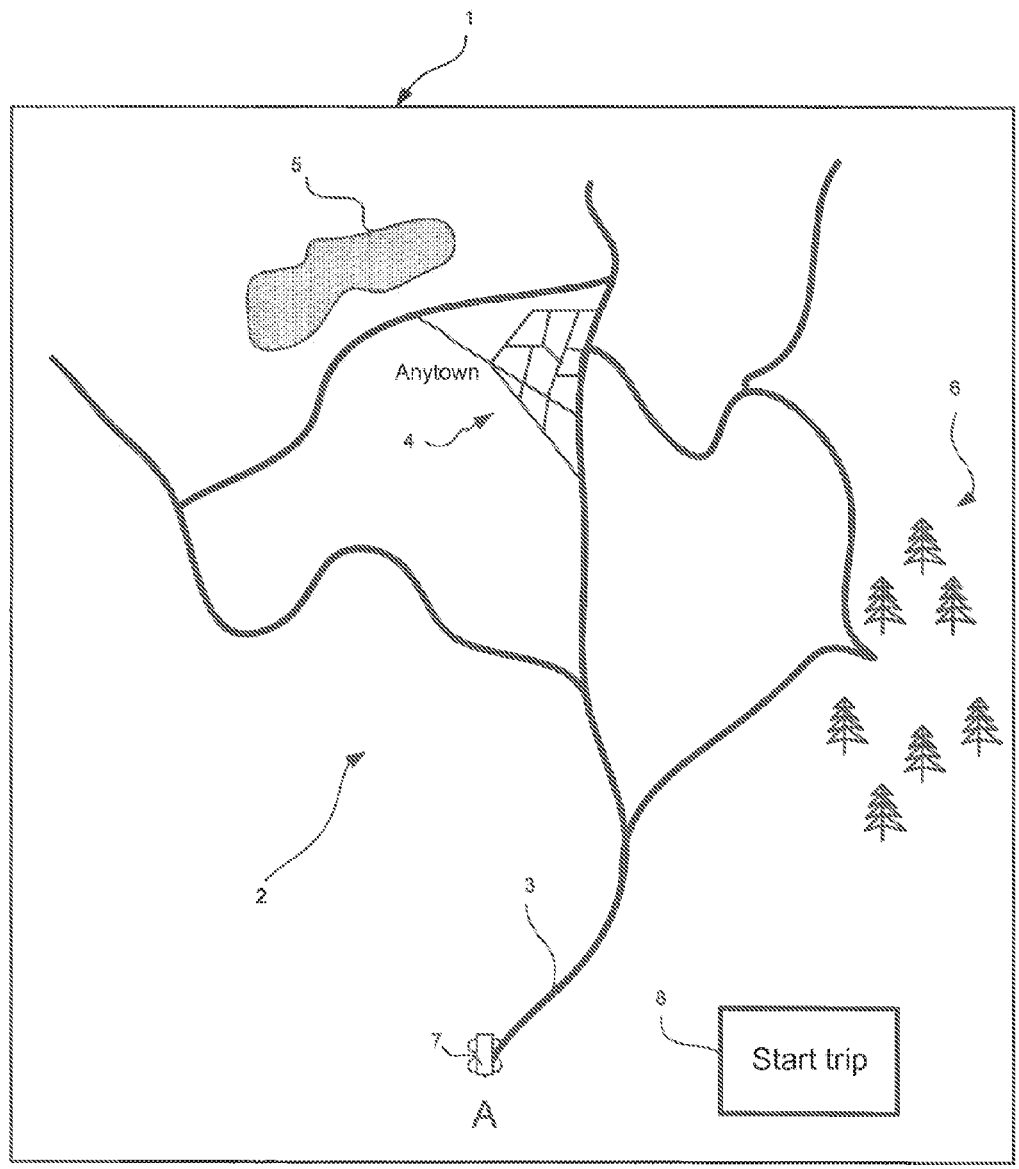
FIG. 1 is a view of a graphical user surface of a navigation system.

FIG. 1 illustrates a graphical user surface of a navigation system. It can be displayed, for example, on a touch-type video screen 1 and shows a map 2 as well as an input control button 8 for starting a trip operating mode of the navigation system. The navigation system may be integrated in a mobile device, such as a mobile telephone, a Smartphone or the like, but may otherwise be mobile or, for example, may be fixedly mounted in a vehicle, particularly in a passenger car. A vehicle symbol will then be shown in the graphical user surface, which vehicle symbol displays in the map 2 the respective position of the navigation system fixedly or temporarily situated in the vehicle. In the situation illustrated in FIG. 1, the passenger car symbol 7 is in a corresponding position A, which corresponds to the starting point of a trip, on the illustrated road system 3. The map 2 further shows the road system 4 of a town called "Anytown" as well as a lake 5 and a forest 6.

Figure 2:
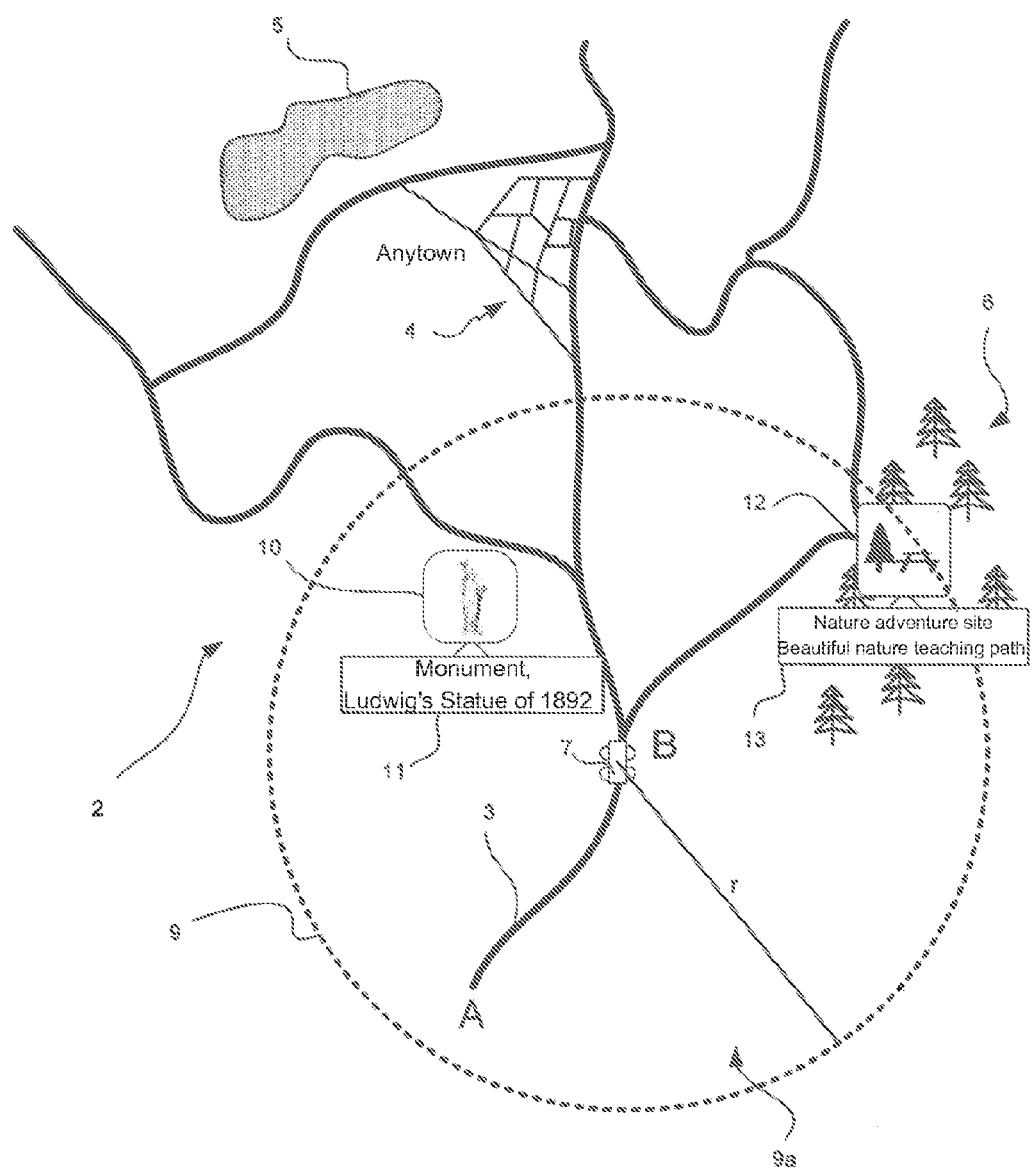
FIG. 2 is a view of a map with a vehicle symbol in a first position.

After an operating of the control button 8, the navigation system will search in the surrounding area of a certain distance for entries in the navigation system which are marked as points of interest. FIG. 2 illustrates a corresponding output when, on a trip from Point A, the passenger car or its symbol 7 has arrived at an intersection Point B of the road system 3. A search takes place for point-of-interest entries around the vehicle within a surrounding radius 9, which corresponds, for example, to a radius r=10 km. The vehicle or its symbol 7 form the center of the surrounding radius 9. In the illustrated example of FIG. 2, entries are found concerning two points of interest, specifically, a point of interest of the "Monument" category and a point of interest of the "Hiking" category. Correspondingly, a monument symbol 10 along a driving route extending from road intersection Point B at the top left is dynamically inserted into the map 2 as soon as the monument or its coordinates arrive within the surrounding radius 9. A corresponding situation exists with respect to the hiking point of interest, where a nature adventure symbol 12 is dynamically inserted into the driving route from road intersection Point B toward the top right. Below the monument symbol 10 and jointly or isochronously with it, a short description of only 4 words concerning the monument is displayed in a display field 11, specifically "Monument. Ludwig Statue of 1892". For the nature adventure symbol, the corresponding short description "Nature Adventure Site. Beautiful Nature Teaching Path" is inserted into a display field 13.

Figure 3:
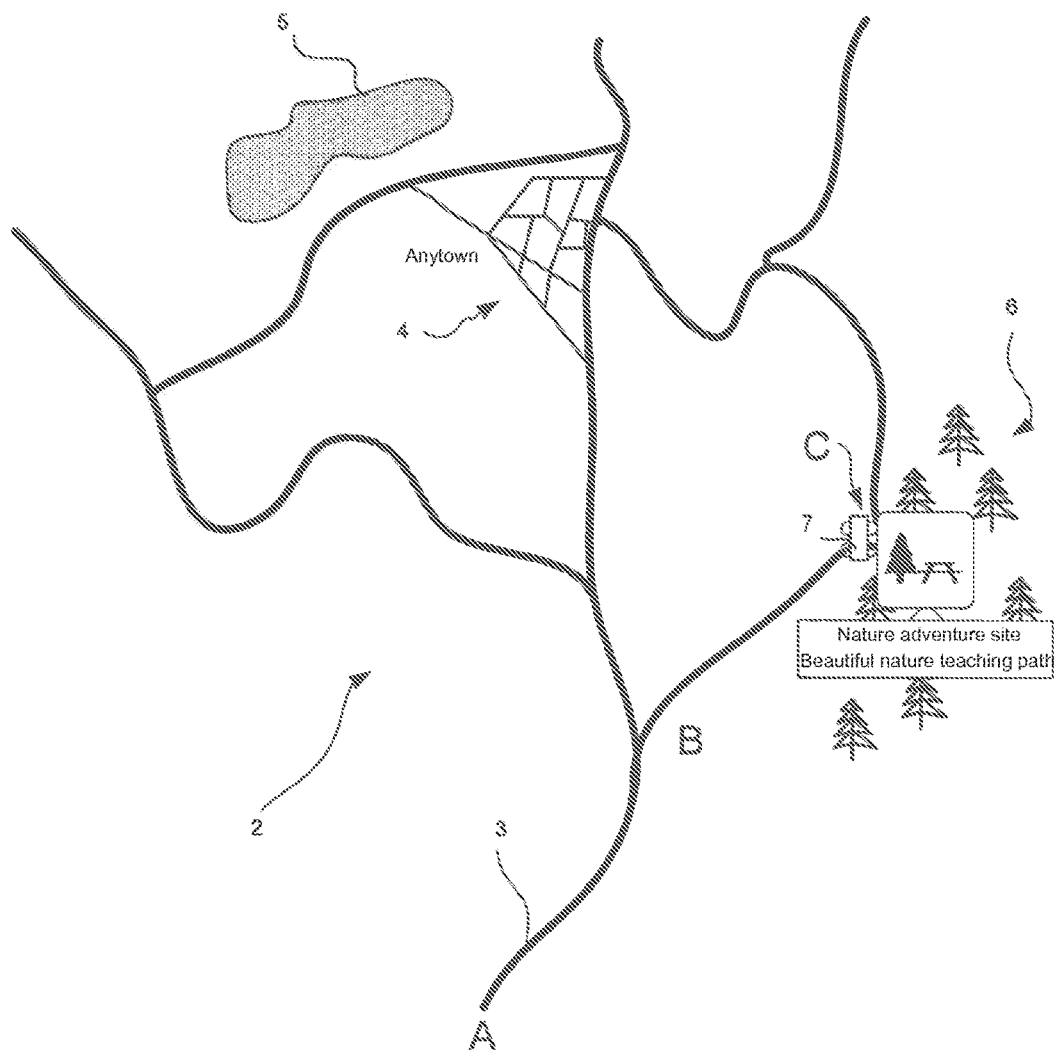
FIG. 3 is a view of the map with the vehicle symbol in a second position.

FIG. 3 shows a situation in which, for example, an excursion group taking a trip in their passenger car has decided to take the driving route toward the top right, and the passenger car or its symbol 7 has arrived at Point C, specifically the nature teaching path in the forest 6. Symbol 10 and display field 11 of the monument were automatically hidden by the navigation system as soon as the latter recognized that the vehicle is being steered toward a different point of interest in the forest 6.

Figure 4:
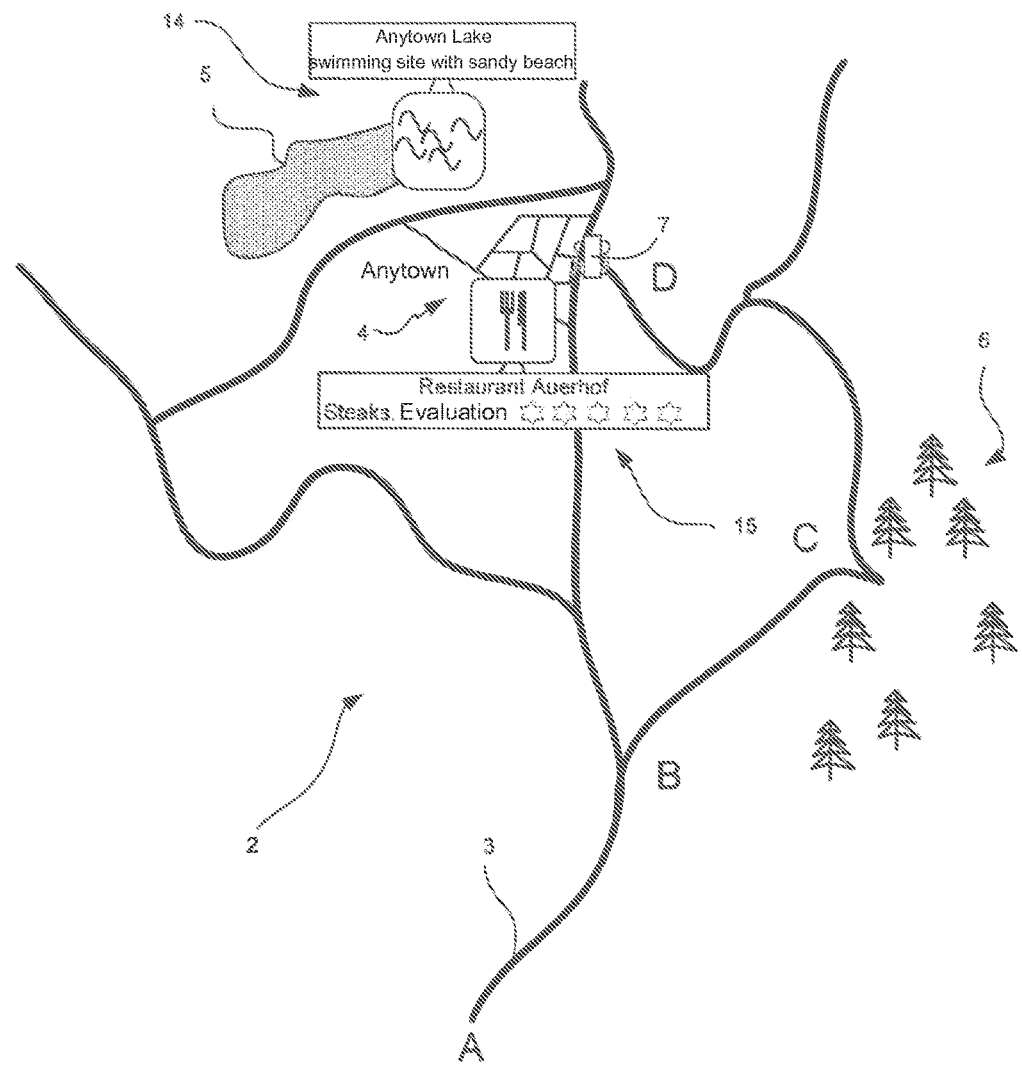
FIG. 4 is a view of the map with the vehicle symbol in a further position.

After a demanding hike through the forest 6, the group continues their trip in the direction of road intersection Point D (FIG. 4). There again, the display fields 14, 15 for the point of interest (symbols plus short description) light up dynamically at the operating interface. In the display field 15, a star-type evaluation appears in addition to the restaurant symbol, which indicates that the "Auerhof" Restaurant was highly recommended by guests. Encouraged by this good evaluation, the excursion group spontaneously decides to first fortify themselves with a steak meal in the Auerhof Restaurant before driving to the swimming beach at Anytown Lake indicated in display fields 14 for relaxation and concludes their exploration trip there, before traveling, for example, on any route back to starting Point A or selecting another fixed travel destination.

Figure 5:
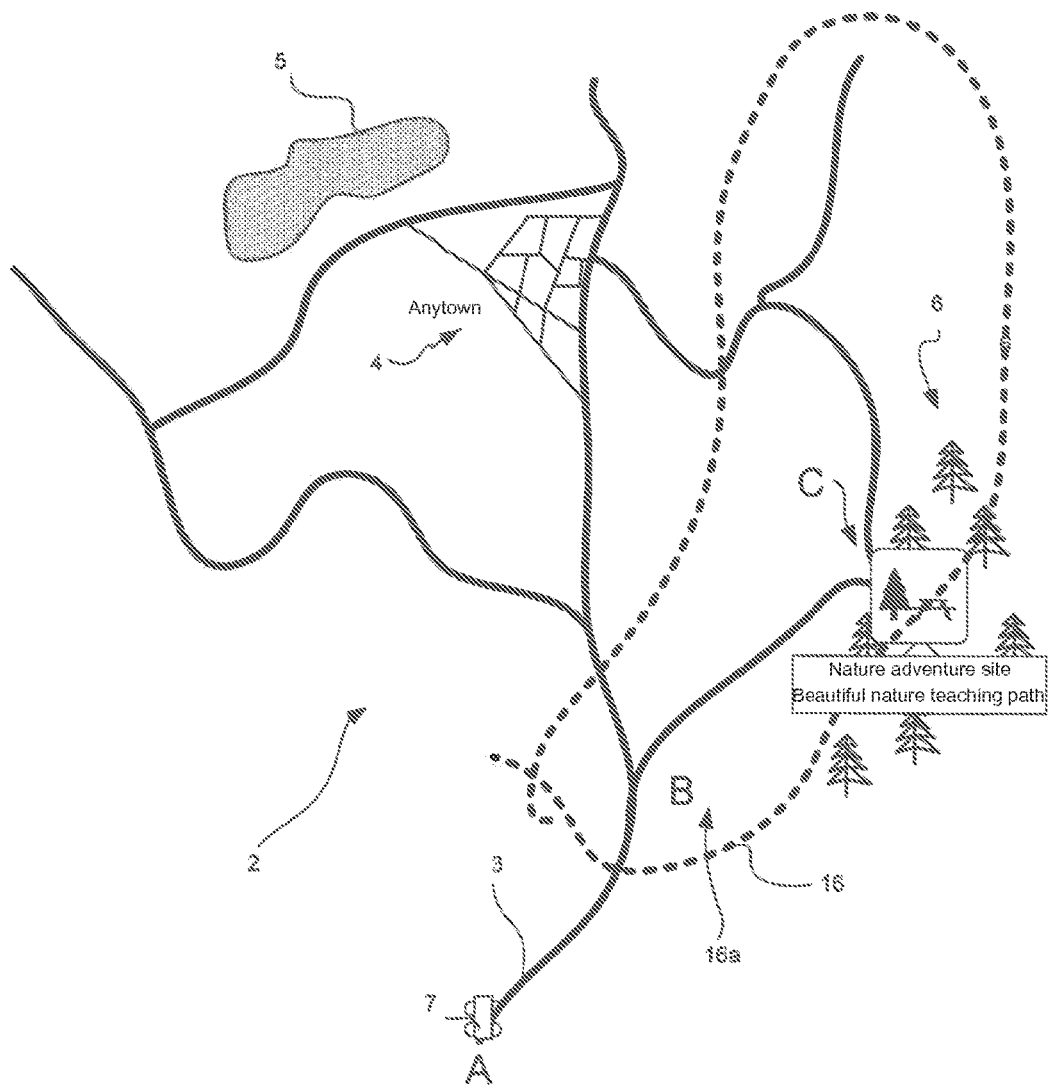
FIG. 5 is a view of the map with an area delimitation.

For the selection of surrounding-area parameters, corresponding displays and control buttons can be provided in the graphical user surface of the navigation system displayed on the video screen. FIG. 5 shows an embodiment for the selection, wherein, by use of a pointing device, such as a cursor arrow, a lasso 16 is illustrated, by which a destination area 16*a* is delimited, in the present example, an area which includes parts of the forest 6, but, for example, not the town 4 and the lake 5.

Figure 6:
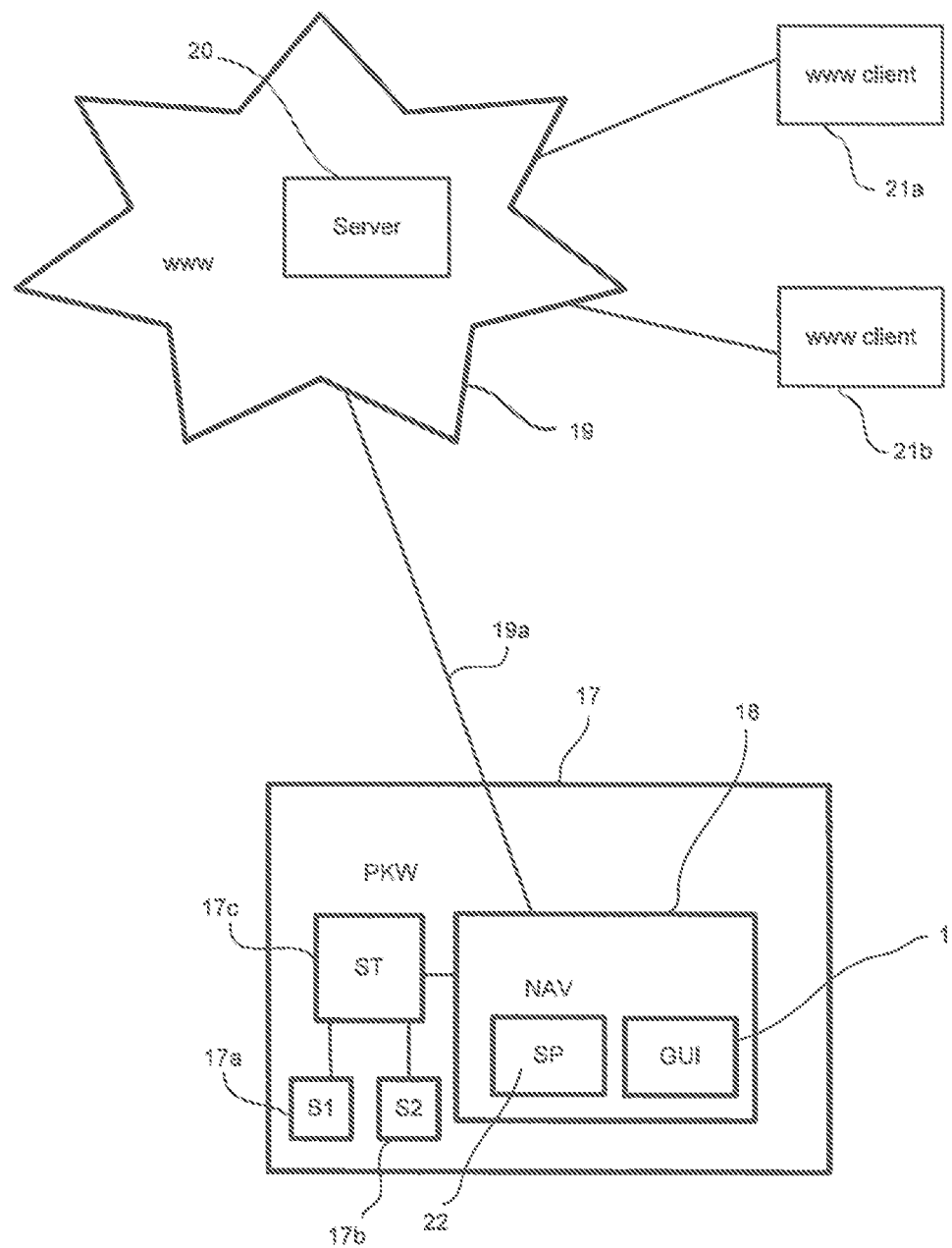
FIG. 6 is a view of a navigation system.

FIG. 6 illustrates several components of a route system suitable for implementing the invention. In this case, a navigation device 18 is fixedly installed in a passenger car 17 and, by way of a telecommunication connection 19*a* by way of the internet 19 can establish a connection to a data server 20 in which computer programs are running for managing a social network. Evaluation data are, for example, stored there, which users enter from client computers 21*a*, 21*b* with respect to places, sights, products, restaurant, etc. These data can be downloaded from the navigation system 18 with respect to currently relevant places of interest, can be stored in its internal memory and can be used for the display on the video screen 1 representing the graphical user surface.

The navigation device 18 contains a satellite-supported position acquisition system (GPS). In a first storage part of the memory 22, the coordinates and additional information concerning the different places of interest are stored. In a second first storage part of the memory 22, the destination-area parameters are stored. The navigation device 18 also contains an acquisition system for the dynamic acquisition of the destination area during the trip corresponding to the inputted destination parameters. The acquisition system can therefore particularly be a computer program which, as required, is loaded into the memory 22 and/or into a working memory of the navigation device 18 and is implemented on a processor of the navigation device 18 for the processing of diverse data, for example, current position data, coordinate data of the places of interest and/or destination area parameters. The computer program as well as at least a portion of the destination area parameters, the coordinates and/or the additional information of the places of interest, as required, can be loaded into the navigation device 18 by way of one or more interfaces of the navigation device 18, for example, by way of the internet connection 19*a*.

By use of a sensor 17*a*, the charge status of the vehicle battery is determined in the passenger car 17, which in this embodiment is an electric vehicle, and is reported to the control device 17*c*. An additional sensor 17*b* detects the actual current consumption and also reports it to the control device 17*c*. By use of the two sensor values and/or additional values, as, for example, an integral or average of the current value, the present range of the vehicle can be determined. The control device 17*c* is further connected with the navigation device 18 and can exchange data with the latter, for example, for the display of the current value, of the charge value and/or of the determined present vehicle range. For determining the vehicle range and, if applicable, values connected therewith, in addition, relevant data can be transmitted from the navigation device to the control device 17*a*, for example, route data, such as the route, the altitude chart, the type of road, the nearest charging station, etc., for the currently intended route and/or for the route covered since the start from Point A.

Although the above description discusses a drive by a passenger car equipped with a navigation system and the corresponding method and device characteristics, it is clear that the description also correspondingly applies to drives or trips by way of other motor vehicles or by bicycle or to pedestrians or hikers. It can, for example, also be used for city tours, if a corresponding navigation system or navigation device is available in an equipped fashion. In addition, the navigation method may have known navigation system characteristics, for example, when selecting a point-of-interest symbol, automatically computing a driving route to the point of interest, and designing the display on the graphical user surface with corresponding displays, such as arrow symbols, changes of scale, etc. In particular, the illustrated devices and system components are controlled by way of computer programs and, for this purpose, may have elements known per se of computers and digital control devices, such as a processor, volatile and non-volatile memories, interfaces, etc.

LIST OF REFERENCE SYMBOLS

1 Video screen
2 Map
3 Road network
4 City street system
5 Lake
6 Forest
7 Passenger car symbol
8 Starting control button
9 Surrounding radius
9*a* Destination area
10 Monument symbol
11 Display field for monument description
12 Hiking symbol
13 Display field for hiking description
14 Restaurant display fields
15 Swimming beach display fields
16 Lasso
16*a* Destination area
17 Passenger car
17*a* Sensor
17*b* Sensor
17*c* Control device
18 Navigation device
19 Internet
19*a* Telecommunication connection
20 Server
21*a* First client
21*b* Second client
22 Memory
A Starting point
B First road intersection point
C Hiking point
D Second road intersection point The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A navigation method, in which coordinates and additional information concerning several places of interest are stored as data in a memory of a navigation device, comprising the acts of:
predefining surrounding-area parameters by which surrounding areas are respectively defined;
during a traveling movement, acquiring by the navigation device, a surrounding area based on the surrounding-area parameters and a current location of the navigation device;
determining, by the navigation device using the stored coordinates and without regard to route information, that at least one of the places of interest of the stored places of interest is situated in the acquired surrounding area; and outputting, by way of a user interface of the navigation device, a symbol representing the at least one of the places of interest and the additional information stored with respect to the at least one of the places of interest by dynamically lighting up the symbol and the additional information on the user interface as soon as the at least one of the places of interest arrives within the acquired surrounding area; and determining, based on the traveling movement and the stored coordinates of the at least one of the places of interest and without regard to user input, an intended destination corresponding to at least another one of the places of interest that is different than the at least one of the places of interest.

2. The method according to claim 1, further comprising the act of:

inputting into the navigation device the surrounding-area parameters or a surrounding area, within which a search for stored places of interest occurs, before beginning a trip or at the beginning of the trip, while not inputting a trip destination into the navigation device.

3. The method according to claim 1, wherein the acts of acquiring the surrounding area and/or determining the at least one of the places of interest and the at least another one of the places of interest are done during the travelling movement.

4. The method according to claim 1, wherein the traveling movement occurs on a trip via a vehicle equipped with a navigation system containing the navigation device and the memory storing the data concerning the places of interest, the method further comprising the acts of:

not inputting a trip destination into the navigation system at a beginning of the trip via the vehicle; and acquiring the surrounding area during a drive of the vehicle on the trip based on the surrounding-area parameters and a current location of the vehicle.

5. The method according to claim 1, wherein the additional information concerning the at least one of the places of interest is limited to minimal data content.

6. The method according to claim 1, wherein the additional information concerning the at least one of the places of interest is loaded via data sources.

7. The method according to claim 1, further comprising navigating by way of a vehicle, wherein, via vehicle sensors and/or the navigation device, additional information is determined and displayed by way of an operating interface of the vehicle, such additional information includes at least one of the following:

probable energy consumption until the at least one of the places of interest is reached, probable energy accumulator content when the at least one of the places of interest is reached, possible available energy charging station at the at least one of the places of interest, total energy consumption for the trip to the at least one of the places of interest and a subsequent direct return trip to an original starting place of the trip, and a route distance for a drive to the at least one of the places of interest and subsequent direct return trip to the original starting place of the trip.

8. A navigation system, comprising:

a position acquisition system;

a memory for storing coordinates and additional information concerning places of interest;

a memory for storing surrounding-area parameters;

an acquisition system for dynamically acquiring a destination area during a trip; and a user interface, wherein the navigation system is operatively configured to:

predefine surrounding-area parameters by which surrounding areas are respectively defined;

during a traveling movement, acquire the surrounding-area parameters and a current location of the navigation system, determine, using the stored coordinates and without regard to route information, that at least one of the places of interest of the stored places of interest is situated in the acquired surrounding area; and output, by way of a user interface, a symbol representing the at least one of the places of interest and the additional information stored with respect to the determined at least one of the places of interest by dynamically lighting up the symbol and the additional information on the user interface as soon as the at least one of the places of interest arrives within the acquired surrounding area; and determine, based on the traveling movement and the stored coordinates of the at least one of the places of interest and without regard to user input, an intended destination corresponding to at least another one of the places of interest that is different than the at least one of the places of interest.

9. A vehicle comprising:

a navigation system, comprising:

a position acquisition system;

a memory for storing coordinates and additional information concerning places of interest;

a memory for storing surrounding-area parameters;

an acquisition system for dynamically acquiring a destination area during a trip; and a user interface, wherein the navigation system is operatively configured to:

predefine surrounding-area parameters by which surrounding areas are respectively defined;

during a traveling movement, acquire a surrounding area based on the surrounding-area parameters and a current location of the navigation system;

determine, using the stored coordinates and without regard to route information, that at least one of the places of interest of the stored places of interest is situated in the acquired surrounding area; and output, by way of the user interface, a symbol representing the at least one of the places of interest and the additional information stored with respect to the at least one of the places of interest by dynamically lighting up the symbol and the additional information on the user interface as soon as the at least one of the places of interest arrives within the acquired surrounding area; and determine, based on the traveling movement and the stored coordinates of the at least one of the places of interest and without regard to user input, an intended destination corresponding to at least another one of the places of interest that is different than the at least one of the places of interest.

10. The method according to claim 1, wherein the surrounding area is defined radially about the current location of the navigation device.

11. The navigation system according to claim 8, wherein the surrounding area is defined radially about the current location of the navigation system.

12. The vehicle according to claim 9, wherein the surrounding area is defined radially about the current location of the navigation system.

13. The method according to claim 1, wherein the surrounding area is defined radially surrounding one or more of the places of interest.

14. The navigation system according to claim 8, wherein the surrounding area is defined radially surrounding one or more of the places of interest.

15. The vehicle according to claim 9, wherein the surrounding area is defined radially surrounding one or more of the places of interest.

16. The method according to claim 1, wherein predefining the surrounding-area parameters is based on a user shapeable lasso on an graphical user interface on which the current location is displayed.

17. The navigation system according to claim 8, wherein predefining the surrounding-area parameters is based on a user shapeable lasso on the user interface on which the current location is displayed.

18. The vehicle according to claim 9, wherein predefining the surrounding-area parameters is based on a user shapeable lasso on the user interface on which the current location is displayed.

19. The method according to claim 1, further comprising the acts of:
receiving a selection of the at least one of the places of interest at the user interface of the navigation device; and
computing and displaying a route to the at least one of the places of interest in response to the receiving.

20. The navigation system according to claim 8, wherein:
the user interface is operatively configured to receive a selection of the at least one of the places of interest; and
the navigation system is operatively configured to compute and display a route to the at least one of the places of interest in response to the selection received by the user interface.

21. The vehicle according to claim 9, wherein:
the user interface is operatively configured to receive a selection of the at least one of the places of interest; and
the navigation system is operatively configured to compute and display a route to the at least one of the places of interest in response to the selection received by the user interface.

22. The method according to claim 1, further comprising the act of:
automatically hiding the symbol and the additional information on the user interface as soon as the navigation device determines that a vehicle in which the navigation device is disposed is being steered toward a place of interest other than the at least one of the places of interest.

23. The navigation system according to claim 8, wherein the symbol and the additional information are automatically hidden on the user interface as soon as the navigation system determines that a vehicle in which the navigation system is disposed is being steered toward a place of interest other than the at least one of the places of interest.

24. The vehicle according to claim 9, wherein the symbol and the additional information are automatically hidden on the user interface as soon as the navigation system determines that the vehicle is being steered toward a place of interest other than the at least one of the places of interest.

25. The method according to claim 1, further comprising the act of:
making a decision whether the additional information concerning the at least one of the places of interest is output by way of the user interface as a function of a current battery charge status of a vehicle in which the navigation device is disposed, wherein the additional information is not output if the at least one of the places of interest cannot be reached by the vehicle with the current battery charge status, wherein the vehicle is an electric vehicle, and wherein the at least one of the places of interest is a tourist site, a place for an event or activity, an adventure site, a nature park, or a site with a natural spectacle.

26. The navigation system according to claim 8, wherein the navigation system is further operatively configured to make a decision whether the additional information concerning the at least one of the places of interest is output by way of the user interface as a function of a current battery charge status of a vehicle in which the navigation device is disposed, wherein the additional information is not output if the at least one of the places of interest cannot be reached by the vehicle with the current battery charge status, wherein the vehicle is an electric vehicle, and wherein the at least one of the places of interest is a tourist site, a place for an event or activity, an adventure site, a nature park, or a site with a natural spectacle.

27. The vehicle according to claim 9, wherein the navigation system is further operatively configured to making a decision whether the additional information concerning the at least one of the places of interest is output by way of the user interface as a function of a current battery charge status of the vehicle, wherein the additional information is not output if the at least one of the places of interest cannot be reached by the vehicle with the current battery charge status, wherein the vehicle is an electric vehicle, and wherein the at least one of the places of interest is a tourist site, a place for an event or activity, an adventure site, a nature park, or a site with a natural spectacle.

* * * * *